(12) United States Patent
Reichel et al.

(10) Patent No.: US 7,213,208 B2
(45) Date of Patent: May 1, 2007

(54) DATA CONTAINER FOR INTERACTION BETWEEN A CLIENT PROCESS AND SOFTWARE APPLICATIONS

(75) Inventors: Uwe Reichel, Dielheim (DE); Steffen Tatzel, Nussloch (DE); Matthias Weigt, Ostringen (DE)

(73) Assignee: SAP AG, Walldorf (DE)

( * ) Notice: Subject to any disclaimer, the term of this patent is extended or adjusted under 35 U.S.C. 154(b) by 669 days.

(21) Appl. No.: 10/242,294

(22) Filed: Sep. 12, 2002

(65) Prior Publication Data
US 2004/0051740 A1 Mar. 18, 2004

(51) Int. Cl.
G06F 17/00 (2006.01)
G06F 15/16 (2006.01)

(52) U.S. Cl. ............... 715/746; 715/744; 715/735; 709/205; 707/102

(58) Field of Classification Search ........... 715/746, 715/762, 765, 735, 789, 740; 707/1, 10, 707/104.1; 709/328, 205, 246, 224; 717/100; 705/8, 1
See application file for complete search history.

(56) References Cited

U.S. PATENT DOCUMENTS

| | | | |
|---|---|---|---|
| 5,530,853 A | 6/1996 | Schell et al. | |
| 5,815,703 A | 9/1998 | Copeland et al. | |
| 5,838,321 A | 11/1998 | Wolf | |
| 5,956,704 A * | 9/1999 | Gautam et al. | 707/1 |
| 5,974,410 A | 10/1999 | Copeland et al. | |
| 6,025,841 A | 2/2000 | Finkelstein et al. | |
| 6,055,537 A | 4/2000 | LeTourneau | |
| 6,073,111 A * | 6/2000 | Leymann et al. | 705/8 |

(Continued)

OTHER PUBLICATIONS

Greunz et al., "Supporting Market Transaction Through XML Contracting Containers", *Proceedings of the 6th Americas Conference on Information Systems Amciss*, Aug. 10, 2000, obtained from the Internet at http://www.businessmedia.org/modules/pub/view.php/businessmedia-28>, retrieved on Apr. 22, 2005.

(Continued)

*Primary Examiner*—Tadesse Hailu
(74) *Attorney, Agent, or Firm*—Fish & Richardson P.C.

(57) ABSTRACT

A generic interaction layer is an interface between a client device and APIs associated with accessible applications. The generic interaction layer allows the client to access each of the APIs in a generic and consistent way, without having to know the details of those APIs or the underlying data structure of the associated applications. The generic interaction layer prepares a data container in response to a request from a user interface of the client and divides the data container into portions corresponding to each of the applications.

22 Claims, 6 Drawing Sheets

U.S. PATENT DOCUMENTS

| | | | |
|---|---|---|---|
| 6,104,395 A | 8/2000 | Alimpich et al. | |
| 6,134,559 A | 10/2000 | Brumme et al. | 707/103 R |
| 6,230,211 B1 | 5/2001 | Mahajan | |
| 6,301,582 B1 | 10/2001 | Johnson et al. | |
| 6,304,893 B1 | 10/2001 | Gish | 709/203 |
| 6,356,957 B2 | 3/2002 | Sanchez, II et al. | 719/328 |
| 6,424,991 B1 | 7/2002 | Gish | 709/203 |
| 6,615,253 B1 | 9/2003 | Bowman-Amuah | |
| 6,643,652 B2* | 11/2003 | Helgeson et al. | 707/10 |
| 6,920,461 B2 | 7/2005 | Hejlsberg et al. | |
| 2001/0016881 A1 | 8/2001 | Sanchez, II et al. | 719/328 |
| 2002/0073236 A1* | 6/2002 | Helgeson et al. | 709/246 |
| 2002/0184401 A1* | 12/2002 | Kadel et al. | 709/315 |
| 2003/0037181 A1* | 2/2003 | Freed | 709/328 |
| 2003/0041142 A1* | 2/2003 | Zhang et al. | 709/224 |
| 2003/0046639 A1* | 3/2003 | Fai et al. | 715/513 |
| 2003/0145305 A1* | 7/2003 | Ruggier | 717/100 |
| 2003/0212654 A1* | 11/2003 | Harper et al. | 707/1 |
| 2003/0227482 A1* | 12/2003 | Bach et al. | 345/762 |
| 2005/0044148 A1* | 2/2005 | Son et al. | 709/205 |
| 2005/0154841 A1* | 7/2005 | Sastri et al. | 711/148 |

OTHER PUBLICATIONS

Heberle, et al., "Utilizing Abstract WebEngineering Concepts: An Architecture", *Proceedings of the 34th Hawaii International Conference on System Sciences*, Jan. 3-6, 2001.

Solte et al., "Federated Management of Distributed Data and Services", *Computers in Industry*, Dec. 2000, vol. 43, pp. 203-210.

Vogel, "Service Abstraction Layer", *EuroPLoP Conference*, Nov. 23, 2001, obtained from the Internet at http://web.archive.org/web/20011123061722/http://www.hillside.net/patterns/EuroPLoP2001/papers/Vogel.zip>, retrieved on Apr. 15, 2005.

* cited by examiner

DATA CONTAINER FOR INTERACTION BETWEEN A CLIENT PROCESS AND SOFTWARE APPLICATIONS

TECHNICAL FIELD

This invention relates to a data container for interaction between a client process and software applications.

BACKGROUND

In an enterprise, there are departments that need to be able to interact with two or more different software program applications to obtain the necessary data for typical operations. For example, in a call center, an operator services a customer query. To service the customer, a process (e.g., a user interface ("UI")) on the operator's client device might have to interface with several different software applications. For example, the client process may interact with one application (e.g., customer accounts) to inquire about stored information associated with that customer, for example the customer account number, business address, etc. The client process may interact with another application (e.g., orders) to inquire about an order placed by the customer. Finally, the client process may interact with yet another application (e.g., inventory) to inquire about the current inventory of items in the customer order.

In some existing systems, enabling the client device to access different applications requires that the client process (e.g., UI) have knowledge on how to interact with each of those three different applications. The UI must know about the application program interfaces ("APIs") that allow the UI to interact and retrieve data from each of the different applications. Depending on the application, the UI might also have to know about the data structure used in the particular application to retrieve the desired information or make changes within the currently stored data. The UI must accommodate any special requirements of each of the applications and if a new application is added, the UI must be updated to include the necessary commands for the new application.

SUMMARY

A generic interaction layer is an interface between a client process and APIs associated with the accessible applications. The generic interaction layer enables the client process to access each of the APIs in a generic and consistent way, without the client process having to know the details of those APIs or the underlying data structure of the associated applications. For example, the UI uses the same commands regardless of whether the data is in the customer accounts application, the order application or the inventory application. This generic and consistent approach simplifies a programmer's design for a user interface. The programmer designs and implements a user interface that interacts with the generic interaction layer. This generic approach also allows for the addition and deletion of applications with which the UI interfaces, without the need to update the UI in response to those additions or deletions. The generic interaction layer requires no change to the applications or the associated APIs.

The generic interaction layer generates and maintains models of the data structures of the associated applications, and enables a user interface to access the models to determine the location, within a data structure, of data for which the user interface is searching. To generate the model, the generic interaction layer defines types of data units (e.g., objects in a object oriented paradigm) such that all of the specific data units in the specific applications can be represented generically as one of the defined types. The defined types control the generic operations that can be performed on the data units. Also, the generic interaction layer prepares a data container, using the model, in response to a request from the user interface and transmits the container to the specific application associated with the requested data.

In one aspect, there can be a method comprising enabling a client to access data in applications using a command that is defined independently of the applications in which the data are accessed, a model representing a data structure of the applications; and a data container that conforms with the model and accords with the command. In some embodiments, the command can be associated with data handling, a query, a method defined by a data unit, management of a requested transaction, and/or the like. The command can comprise one of read, modify, create, delete, get_query_result, exec_method, init, lock, save, rollback, commit, and/or the like.

In other embodiments, the method further comprises requesting data needed to populate portions of the data container from the applications and receiving from the applications data responsive to the request. The method can also comprise responding to the command using the data received from the applications. The method can comprise determining API commands to interact with the applications. The method can comprise generating the model by defining a data type for a first data unit of the data structure and defining a relationship between the first data unit and a second data unit.

In another aspect, there can be a method comprising associating a received request with a first application and a second application, generating a data container in response to the request using a first model associated with the first application and a second model associated with the second application, and dividing the data container into a first portion and a second portion corresponding to the first and second applications.

In other embodiments, the method can further comprise generating a global model comprising the first and second models. The method can also comprise requesting data needed to populate the portions from the corresponding applications, and receiving from the applications data responsive to the requests. The method can further comprise responding to the received request using the data received from the applications. The method can also comprise determining API commands to interact with the corresponding applications. The method can further comprise defining a data type for a first data unit of the data structure, and defining a relationship between the first data unit and a second data unit.

In another aspect, there can be an interface layer comprising an interface layer module, an application model module, a first component module and a second component module. The interface layer module is configured to receive a request from a client. The application model module is in communication with the interface layer module and has a first model corresponding to a first application and second model corresponding to a second application. The first component module is also in communication with the interface layer module and corresponds to the first application. The second component module is in communication with the interface layer module and corresponds to the second application.

In other embodiments, the interface layer can also have a data container module in communication with the interface layer module configured to generate a data container in compliance with the first and second models. The first and second component modules can each be further configured to determine an API command to interact with its corresponding application. The first and/or second models can comprise a first data unit having a data type and a defined association with a second data unit.

In another aspect there can be a model comprising a first data unit including a type, a second data unit including a type, and a relationship between the first data unit and the second data unit, the relationship including a unique name, a first cardinality value for the first data unit and a second cardinality value for the second data unit.

In another aspect there can be an interaction center comprising a transceiver to receive a client request from a client device, and a generic interface layer configured to use a model to generate a data container responsive to the client request and to transmit portions of the data container to corresponding applications using associated component modules.

In another aspect there can be a method comprising generating by an interface layer a data container, and dividing the data container into portions corresponding to applications with which the interface layer communicates. In other embodiments, the method can further comprise transmitting the portions to components corresponding to the applications. The method can also comprise generating the data container in response to a client request. The method can further comprise populating the portions with data received from the corresponding applications and responding to the client request using the data. The method can also comprise generating the data container in compliance with a model representing data structures of the applications. The method can further comprise interacting with the data container using a data container API.

In another aspect there can be an interface layer comprising a data container and an interface layer module configured to divide the data container into portions corresponding to applications with which the interface layer communicates. The interface layer can further comprise component modules corresponding to the applications, where each component module is configured to receive a corresponding portion of the data container. The component modules can be further configured to populate the portions with data received from the corresponding applications. The interface layer module can be further configured to respond to a client request using the data. The interface layer module also can be further configured to generate the data container in response to a client request. The interface layer module can be further configured to generate the data container in compliance with a model representing data structures of the applications.

In another aspect there can be an article comprising a machine-readable medium that stores executable instruction signals that cause a machine to perform all of the above-described methods.

All of the above aspects can also have the following features. The model can comprise an XML file, a table, and/or the like. The data type can comprise a root data unit, an access data unit, a dependent data unit, a query data unit, and/or the like. The relationship can comprise an aggregation, a composition, an association, and/or the like. The first data unit and/or the second data unit can comprise an object. The relationship can be unidirectional.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
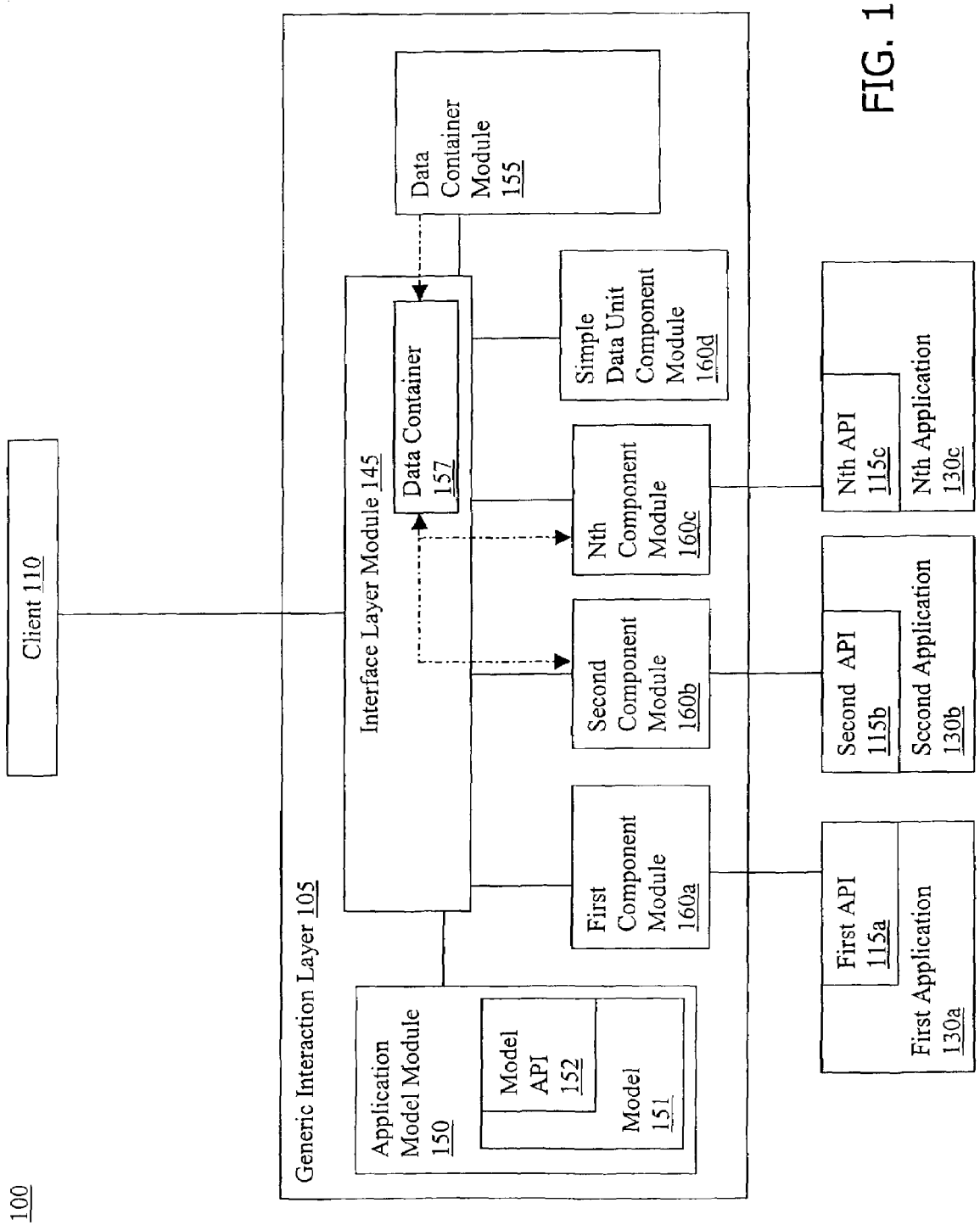
FIG. 1 is a block diagram of a system including an illustrative embodiment of a generic interaction layer.

FIG. 1 illustrates a system 100 that includes an example of a generic interaction layer 105. As shown, the generic interaction layer 105 is an interface between a client process 110 (e.g., user interface) and APIs 115a, 115b, and 115c, generally 115. The APIs 115 are associated with applications 130a, 130b, and 130c, respectively, generally 130. Each API is specific to its associated application 130 and defines routines and protocols that an external process must use to interact with that application 130. Because each application 130 is different, the API for one application is typically different from the API for another application. The generic interaction layer 105 allows the client process 110 to access all of the different APIs 115 in a generic and consistent way, without having to know the details of those APIs 115 or the underlying data structures of the associated applications 130. The generic interaction layer 105 includes an interface layer module 145, an application model module 150, a data container module 155 and component modules 160a, 160b, 160c, and 160d, generally 160.

In general overview, when the client process 110 needs access to one or more of the applications 130, it transmits a generic command, for example a read, create or query request as described in more detail below, to the interface layer module 145. The command from the client process 110 is generic because it is the same (e.g., same command, same format and/or same parameters) whether it relates to the first application 130a, the second application 130b, the nth application 130c, or any combination of them. The client process 110 does not have to have any knowledge about the routines or protocol required by the APIs 115, only the generic commands used by the generic interaction layer 105. These commands are independent of the applications 130 and thus do not change because applications 130 are added or deleted.

In response to the command, for instance read, the interface module 145 obtains from the application model module 150 one or more portions of a stored model 151 of data structures that relate to the command. The interface layer module 145 generates a data container 157, using the obtained one or more portions of a stored model 151 and the data container module 155. The data container 157, unpopulated at this point, is where data from an application 130 that meets the issued command are eventually placed. The interface layer module 145 generates the data container 157 so that it complies with the corresponding model portion (e.g., has the same dependency structure). The interface layer module 145 determines the one or more applicable components 160 (e.g., 160a, 160b, 160c, or any combination of the three) to which the data container 157 needs to be transmitted. If there is more than one component 160 to which the data container 157 needs to be transmitted, the interface module 145 divides the data container 157 according to the applicable components 160. The interface module 145 transmits the data container 157 (or portion thereof) to the appropriate component module(s) 160 corresponding to the appropriate API(s) 115. Each component 160 determines the appropriate API 115 routines and protocols needed to obtain the required data for data container 157 (or portion thereof). When the appropriate API 115 returns the required data, the component 160 transmits the data container 157 (or portion thereof) populated with the retrieved data to the interface layer module 145. The interface layer module 145 responds to the client command using the retrieved data in the data container 157.

In more detail, the application model module 150 contains the model 151 in the generic interaction layer 105. The model 151 represents the data structures within each of the applications 130. The model 151 employs data units for this purpose. A data unit is a unit utilized in creating a data structure. For example, in a data structure utilizing an object-oriented paradigm, a data unit may be an object. In one embodiment, the model employs an abstract data unit capable of creating a generic representation of the data structure. For example, in an object based model, the data units the model employs are objects with exclusively unstructured attributes. In other words, if the model data unit has an attribute, for example date, the model data unit does not structure that attribute to a complex type, for example, day/month/year. The model data type can allow any simple data type, numeric type representations as well as character based representations for the date attribute. This enables the generic interaction layer 105 to handle all attributes in the same way for transport and conversion. It also ensures that each data unit is easy to serialize.

The model 151 contains information about the data units themselves and the relationship among the data units. The model 151 can be represented in several formats. One format, for example, is one or more tables containing all of the model information. Table 1 and Table 2 below show an example of a portion of a tabular model. Table 1 illustrates an example model representation of information about the data units themselves that can be stored in the application model module 150. As illustrated, Table 1 includes a name, a kind, one or more methods and

TABLE 1

| Data Unit Name | Data Unit Kind | Methods | Attributes |
| --- | --- | --- | --- |
| Data Unit A | Root | | |
| Data Unit B | Dependent | | |

TABLE 1-continued

| Data Unit Name | Data Unit Kind | Methods | Attributes |
| --- | --- | --- | --- |
| Data Unit C | Access | | |
| Data Unit D | Dependent | | |
| Data Unit E | Dependent | | | one or more attributes for each data unit in this model representation. The names are unique names so that each data unit can be identified. This uniqueness applies to the entire model 151 in the application model module 150. For example, if the first application 130a has a Data Unit A and the second application 130b also has a Data Unit A, the generic interaction layer 105 assigns different names in the model 151 so that they can be differentiated from each other. In one embodiment, the generic interaction layer 105 assigns a prefix based on the component 160 with which the model is associated. For example, the generic interaction layer 105 assigns the data unit from the first application 130a the name COM1 Data Unit A and the data unit from the second application 130b the name COM2 Data Unit A.

The data unit kind defines the type of the data unit in the relational model and determines how the generic interaction layer 105 manipulates that data unit. Table 1 includes three different kinds, a root data unit, an access data unit, and a dependent data unit. A root data unit is a data unit within a group of data units that are linked to one another in a hierarchy structure via aggregations, as described in more detail below. The root data unit is the only data unit within this structure that is assigned as a superior data unit to all other data units in the hierarchy. Each root data unit is also an access data unit. An access data unit is any data unit in which the generic interaction layer 105 can determine both the attributes of the access data unit and its dependent data units by using the access data unit's ID. An ID is an identifier that the generic interaction layer 105 uses to identify, along with its name, a particular instance of a data unit in one of the applications 130. In one embodiment, the ID can be equivalent to a table key used by an application 130. A dependent data unit is a data unit in which the generic interaction layer 105 cannot determine the attributes solely from its ID, but only together with the ID of a superior access data unit. A model can also include a query data unit, shown in the XML model below. A query data unit is a data unit whose attributes are the parameters of a search request. A result data unit, also shown in the XML model below, of a search request is an associated access data unit.

The methods parameter in the model is an optional parameter and represents the one or more methods available for that particular data unit. The form of the methods in the model can comprise an embedded table, or point to a table that holds method names and parameters. The attributes column can also hold an embedded table describing the names and types of the attributes of the data unit. In another embodiment, the attributes portion of the model can refer to a data dictionary which holds the description of the attribute structure.

Figure 2:
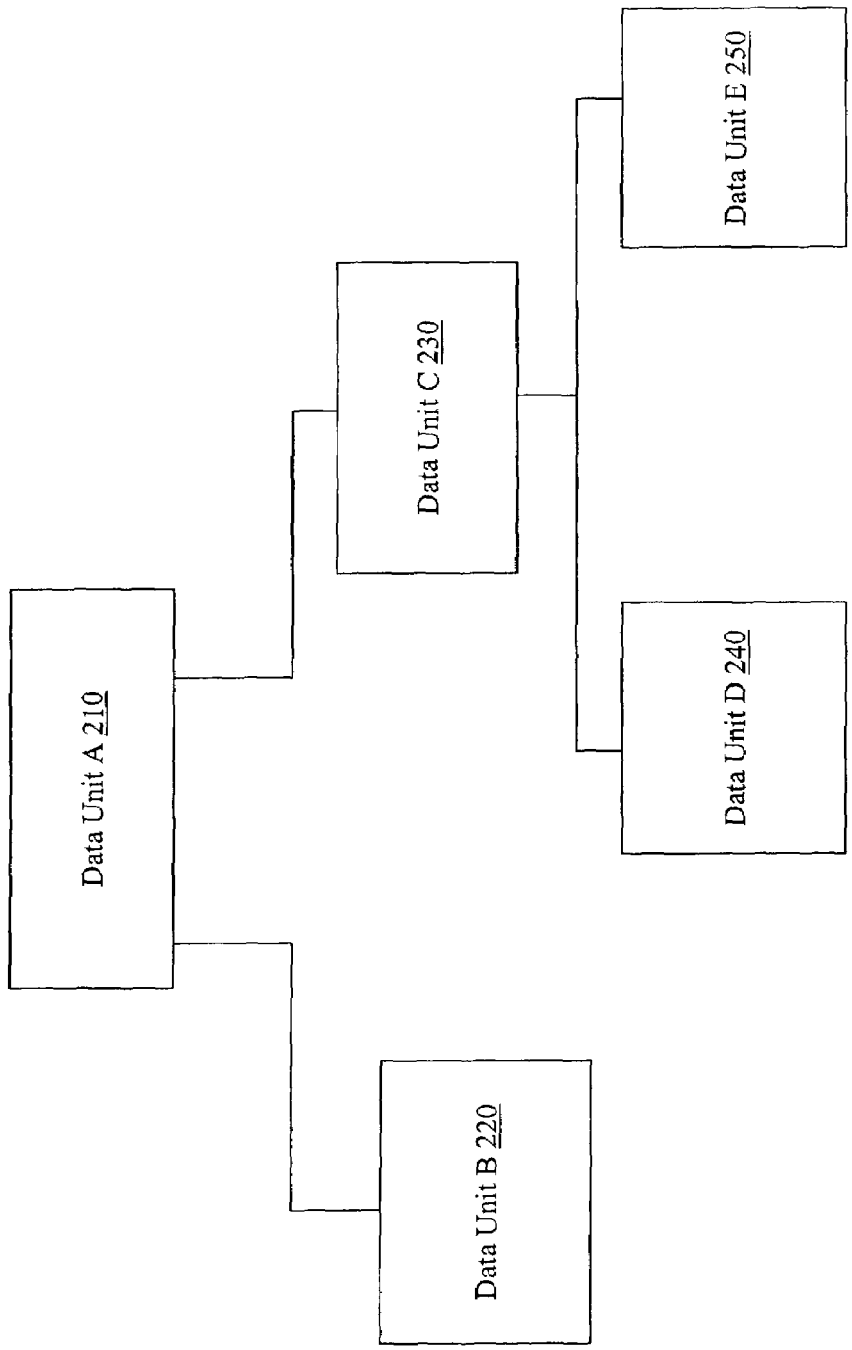
FIG. 2 is a block diagram of an embodiment of a relational structure of data units.

FIG. 2 illustrates an embodiment of a hierarchical structure 200 of the relationships among Data Unit A 210, Data Unit B 220, Data Unit C 230, Data Unit D 240, and Data Unit E 250. Table 2 illustrates an example model representation of information about the relationships among the data units 210, 220, 230, 240, and 250. As illustrated in Table 2, the relationships

TABLE 2

| "From" Data Unit | Cardinality of "From" Data Unit | Name of Relation | "To" Data Unit | Cardinality of "To" Data Unit | Relation Kind |
|---|---|---|---|---|---|
| Data Unit A | 1 | to B | Data Unit B | 0 to 1 | Aggregation |
| Data Unit A | 1 | to C | Data Unit C | 0 to 1 | Aggregation |
| Data Unit C | 1 | to D | Data Unit D | 0 to 1 | Composition |
| Data Unit C | 1 | to E | Data Unit E | 0 to 1 | Composition | are modeled as unidirectional relationships. The direction is from the data unit in the first column, the "From" data unit, to the data unit in the fourth column, the "To" data unit. The cardinality of each data unit is also included in the model. The cardinality of a data unit represents the multiplicity in which a data unit may appear in the relation. For example, one data unit BusinessPartner may have many Addresses, but at least one. In this case the "From" cardinality is 1 and the "To" cardinality is 1 to n. The same BusinessPartner of this example has only one DefaultAddress. So the "From" cardinality is again 1, but the "To" cardinality is now also 1. The cardinality values can be 1, 0 to 1, 0 to n, or 1 to n. The name of the relation column indicates a unique name for that particular relationship. This name is unique with respect to the entire model 151 stored within the application model module 150.

The relation kind indicates the type of the relationship. An aggregation relation indicates a relation where the existence of the referenced data unit, the "To" data unit, depends on the reference holder, the "From" data unit. For example, as illustrated in Table 2, Data Unit B 220 and Data Unit C 230 depend from Data Unit A 210 and an instance of each exists only if an instance of Data Unit A 210 exists. A composition relation indicates a relation where the existence of the referenced data unit, the "To" data unit, depends on the reference holder, the "From" data unit and the reference holder itself cannot exist without its referenced objects. For example, as illustrated in Table 2, Data Unit D 240 and Data Unit E 250 depend from Data Unit C 230 and an instance of each exists only if an instance of Data Unit C 230 exists. Further and unlike the aggregation relation, when Data Unit C 230 exists, then both Data Unit D 240 and Data Unit E 250 will also exist. Another type of relation can be an association. An association relation indicates a relation where both of the related data units, the "To" data unit and the "From" data unit, can exist independently of each other.

Figure 3:
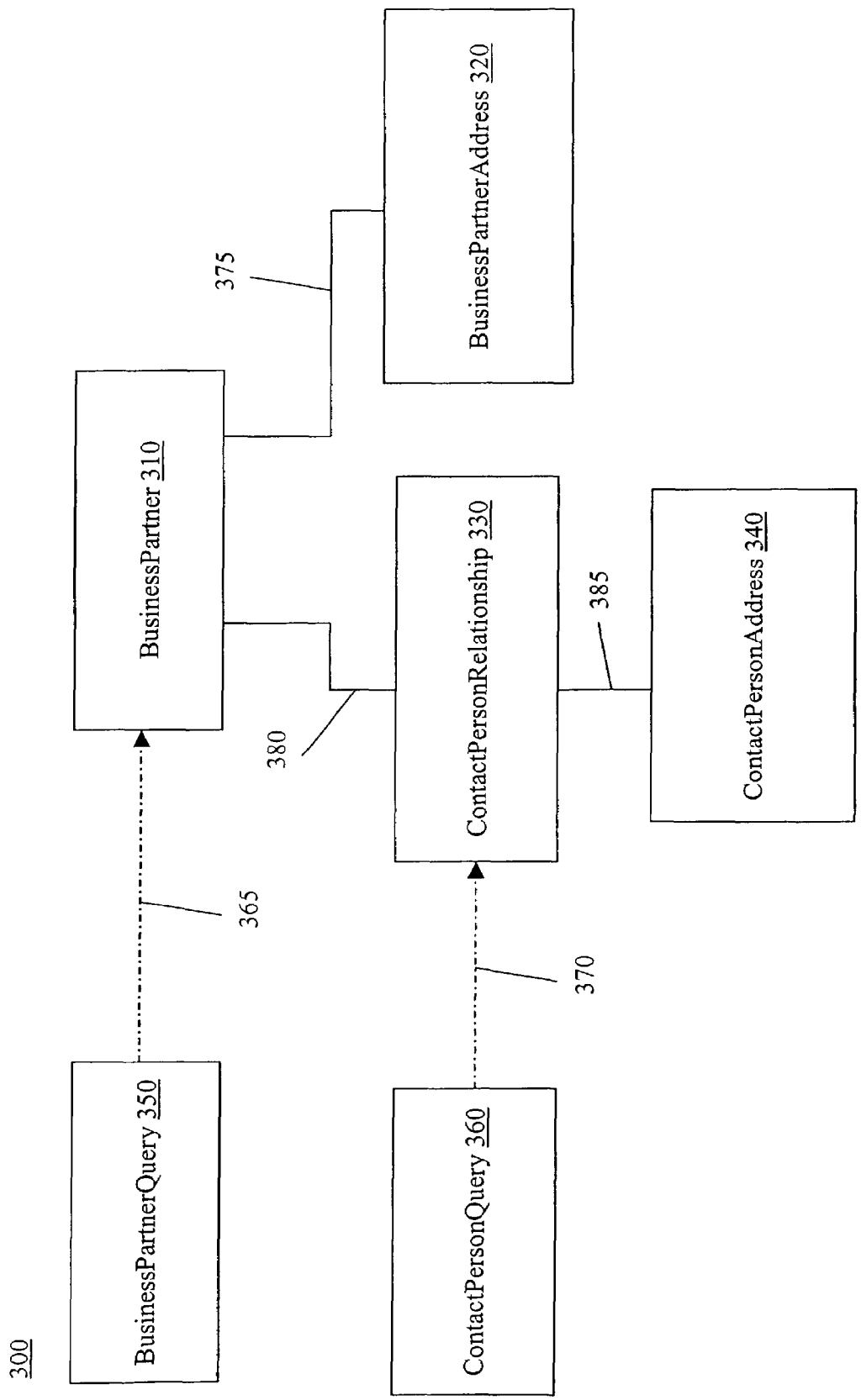
FIG. 3 is a block diagram of another embodiment of a relational structure of data units.

Another format for a model, for example, is an XML file. An example XML file representing a portion of the model 151 is set forth below. Similar to the tabular model above, the XML model includes both information about the modeled data units themselves and the relationships among the defined data units. FIG. 3 illustrates an embodiment of a data structure 300 of the relationships among the data units BusinessPartner 310, BusinessPartnerAddress 320, ContactPersonAddress 330, ContactPersonRelationship 340, BusinessPartnerQuery 350, and ContactPersonQuery 360 represented by the example XML model.

The example XML model starts with defining four data units, referred to as entities. The first data unit 310 has the name BusinessPartner. The XML model defines this first data unit as a root data unit, as indicated by the line "<ISROOTOBJECT>true</ISROOTOBJECT>". The XML model defines four properties for the data unit BusinessPartner 310 and no methods. The next data unit 320 has the name BusinessPartnerAddress. The XML model defines this data unit as a dependent data unit, as indicated by the line "<ISROOTOBJECT>false</ISROOTOBJECT>", with its dependency under the root data unit BusinessPartner 310, as indicated by the line "<ROOTNAME>BusinessPartner</ROOTNAME>". The XML model defines five properties for the data unit BusinessPartnerAdress 320 and no create parameters or methods. The next data unit 340 has the name ContactPersonAddress. The XML model defines this data unit as an access data unit, as indicated by the lines "<ISROOTOBJECT>false</ISROOTOBJECT>" and "<ISACCESSOBJECT>true</ISACCESSOBJECT>", with its dependency under the root data unit BusinessPartner 310, as indicated by the line "<ROOTNAME>BusinessPartner</ROOTNAME>". The XML model defines five properties for the data unit ContactPersonAddress 340 and no create parameters or methods. The next data unit 330 has the name ContactPersonRelationship. The XML model defines this data unit as a dependent data unit, as indicated by the line "<ISROOTOBJECT>false</ISROOTOBJECT>", with its dependency under the root data unit BusinessPartner 310, as indicated by the line "<ROOTNAME>BusinessPartner</ROOTNAME>". The XML model defines five properties for the data unit ContactPersonRelationship 340 and no create parameters or methods.

The example XML model next defines two query data units, referred to as query services. The first query data unit 350 has the name BusinessPartnerQuery. The XML model defines the return entity (e.g., result data unit) for the BusinessPartnerQuery query data unit 350 as a BusinessPartner data unit 310, as indicated by arrow 365 in FIG. 3. The XML model defines seven properties for the data unit BusinessPartnerQuery 350. As described above, the defined attributes (e.g., properties) of the query data unit generate the parameters of a search request. The next query data unit 360 has the name ContactPersonQuery. The XML model defines the return entity (e.g., result data unit) for the ContactPersonQuery query data unit 360 as a ContactPersonRelationship data unit 330, as indicated by arrow 370 in FIG. 3. The XML model defines seven properties for the data unit ContactPersonQuery 350.

The example XML model next defines three relationships among data units, as indicated by 375, 380, and 385 in FIG. 3. Similar to the tabular model, for each relation the XML model defines a unique name and a type. Similar to the tabular model, the XML model also defines a "From" data unit, indicated as the <SOURCE>, with the data unit name and its cardinality value and a "To" data unit, indicated as the <TARGET>, with the data unit name and its cardinality value.

The example XML model defines the first relationship 375, between the BusinessPartner data unit 310 and the BusinessPartnerAddress data unit 320, as an aggregation type with the name BuilStandardAddressRel. The example XML model defines the second relationship 380, between the BusinessPartner data unit 310 and the ContactPerson- Relationship data unit 330, as an association type with the name BuilContactPersonRel. The example XML model defines the third relationship 385, between the ContactPersonRelationship data unit 330 and the ContactPersonAddress data unit 340, as an aggregation type with the name BuilContactPersonAddressRel.

As described below, the generic interaction layer 105 uses the model data to build data containers to manipulate data within the applications 130. In addition, the generic interaction layer 105 can expose the generic model itself to the client process 110, for example, via a model API 152. This enables client process 110 to determine, for example, the data unit type, all related data units, the type of the relationship, the component with which the data unit is associated, the root data unit to which a referenced data unit belongs, and the like. The following are some example methods included in the model API 152. A get_instance( ) method returns a reference to the instance of the model API class. In one embodiment, this reference is needed to get access to all the other services. A get_access_data_unit( ) method returns the name of the access data unit to which a given data unit belongs. A get_component_name( ) method returns the name of the component to which a given data unit belongs. A get_data_unit_kind( ) method returns the data unit kind (e.g., root, access, dependent, and the like) of a given data unit. A get_parent_data unit( ) method returns a list of "From" data units that are connected to a given "To" data unit via a relation. Both the parent data unit names and the relations are returned. A get_related_data_unit( ) method returns the name of the data unit that is the target data unit of the given relation. A get_relation_kind( ) method returns the information whether the relation is an association, an aggregation, or a composition. A get_root_data_unit( ) method returns the name of the root data unit to which a given data unit belongs. An is_access_data_unit( ) method returns the information if a given data unit is an access data unit or not. A relation_is__1l( ) method returns the information if a given relation is a 1:1 or a 1:n relation.

Referring back to FIG. 1, in addition to maintaining the models (e.g., tabular, XML, and the like), the generic interaction layer 105 defines generic commands that enable the client process 110 to access data from any one or more of the applications 130. These generic commands enable the client process 110 to perform data handling, queries, methods defined by the data units, and management of requested transactions. The commands can serve for multiple root data units with one call, enabling them to handle mass data.

For data handling for example, the interface layer module 145 can accept the commands read( ), modify( ), create( ), and delete( ). The read( ) command enables the client process 110 to read one or more data units in one or more applications 130. An import parameter for the read( ) command can be one or more referenced data units and an export parameter can be the data the generic interaction layer 105 obtains when the generic interaction layer 105 reads the referenced data unit(s). The modify( ) command enables the client process 110 to modify one or more data units. The modify( ) command is typically used to make changes in data units. It serves also for creation and deletion of dependant data units. An import parameter for the modify( ) command can be the modification data and export parameters can be a reference list of changed data units and an ID mapping. These features enable the client process 110 to know that data units other than the sent ones may have changed too. In an order handling application for example, a modification to a product quantity of a sales item also causes a change to the order value on an order header, even though the client process hasn't changed the order header directly.

As a general example, a transaction that changes data units comprises the three following steps, which, depending on the underlying application may be performed discretely or in combination. The generic interaction layer 105 modifies data units in response to the modify( ) command. This helps to synchronize the client process 110 with the applications 130. The generic interaction layer 105 saves the modified data units in response to the save( ) command. This persists the changes. The generic interaction layer 105 commits the changes in response to a central commit( ) command. This command is especially useful if the data is persisted on a data base. With the commit( ) command, all saved data is written in one step to the data base.

The create( ) command enables the client process 110 to create one or more instances of root data units. Import parameters for the create( ) command can be the data unit name, and a parameter list. An export parameter can be the data for the created data unit. The delete( ) command enables the client process 110 to delete one or more data units. An import parameter for the delete( ) command can be a list of data units to be deleted and an export parameter can be a status message, for example if there is an error generated which prohibits the deletion. The create( ) and delete( ) commands typically operate only on root data units.

For queries for example, the interface layer module 145 can accept a get_query_result( ) command. The get_query_result( ) command enables the client process 110 to query one or more applications 130. Import parameters for the get_query_result( ) command can be a query name, a parameter list and a request data unit. An export parameter can be the resulting data. For methods defined by the data units for example, the interface layer module 145 can accept an exec_method( ) command. The exec_method( ) command enables the client process 110 to execute specific methods of one or more data units. Import parameters for the exec_method( ) command can be a data unit list, a method name and an optional parameter list. An export parameter can be a status message, for example if there is an error generated which prohibits the method from completing.

For management of requested transactions for example, the interface layer module 145 can accept the commands init( ), lock( ), save( ), rollback( ), and commit( ). The init ( ) command enables the client process 110 to undo modifications. The init( ) command rejects any previous changes that were not saved (e.g., persisted). The lock( ) command enables the client process 110 to lock a list of one or more data units in one or more applications 130 that the client process 110 will modify. The lock( ) command freezes the current state of the indicated data units at the applicable applications 130 so that subsequent modification by the generic interaction layer 105 is from the locked current state. The save( ) command enables the client process 110 to save the current state of the modifications. The commit( ) command enables the client process 110 to instruct the applicable application 130 to persist (e.g., store in persistent storage) the modifications of the current transaction (e.g., started with lock( ) command) that were saved to the applicable applications 130. The rollback( ) command enables the client process 110 to change the current state of modifications back to a previous state (e.g., undo a save( ) command within a transaction). Import parameters for all of the transaction management commands, except commit( ) and rollback( ) can be a list of applicable data units. An export parameter can be a status message, for example if there is an error generated which prohibits the commanded transaction.

As described above, in response to the commands received from the client process 110, the generic interaction layer 105 interacts with the applications 130. As illustrated in FIG. 1, the generic interaction layer 105 can include a component 160 for each application 130 with which the generic interaction layer 105 interacts. The first component 160a communicates with the first API 115a associated with the first application 130a. The second component 160b communicates with the second API 115b associated with the second application 130b. The Nth component 160c communicates with the Nth API 115c associated with the Nth application 130c. Applications can include, for example, word processors, database programs, spreadsheet programs, development tools, drawing, paint, image editing programs, and communication programs. The components 160 are configured to translate the requests for data within a data container to the appropriate API commands for that component's 160 respective API 115.

The component 160 obtains model data from the application with which it is associated or from its own repository. The component 160 transmits its model data to the application model module 150. The components 160 can also be configured to enable an administrator to access the model data of an application 130 and generate a model of that data structure to be added to the global model 151 in the application model module 150, perhaps when the administrator is adding another application 130 to interact with the generic interaction layer 105. Regardless of the process, the generic interface layer 105 obtains all model information for each application 130 and stores the collection as a global model 151, stored in the application model module 150, with each data unit in the global model having a unique identifier as described above. A portion of the model 151 corresponds to each of the applications 130.

Also illustrated is a simple data unit component 160d that is not associated with a particular application 130. A simple data unit is a single data unit within the data structure in which data can be manipulated without reliance on other associated data units. For example, in an object oriented data structure where a data unit is an object, a simple data unit is an object that can be manipulated (e.g., locked, saved) by directly accessing that object. Because there are no other dependent data units that have to be manipulated in association with this simple data unit, a data container preserving the relational information is not necessary. Without such a data container, the interface is simplified. The simple data unit component 160d enables this simplicity because it includes the data container handling and hides this complexity for the simple data units.

When data containers are needed, the data container module 155 represents the software and/or hardware the generic interaction layer 105 uses to generate and manage data containers. The generic interaction layer 105 uses data containers to transport the data associated with data units. The generic interaction layer 105 generates data containers in accordance with the maintained model. With its generation, the data container provides read and write access to a generic data structure defined by the models.

For illustration purposes only, Table 1 and Table 2 above define part of a global model of this example. The client process 110 transmits the request to read an attribute of a particular identified instance of Data Unit D. As described above, the generic interaction layer 105 must identify either a root data unit or an access data unit to manipulate data. The level of the data unit depends of the desired task to be performed. For a read task, only a uniquely identifiable access object is needed. Because the Data Unit D is a dependent data unit type, the client process 110 identifies the closest superior access object as Data Unit C, using the central model API 152 to identify the relationship. The client process 110 obtained the identifier for this particular instance of data unit C, for example, in a previous query using a query data unit. The client process 110 sends a read request with the reference to data unit C and the part of the model to read (e.g, from data unit C over relation "toD" to data unit D). The generic interaction layer 105 generates a data container including the data structure as defined in the tables for data units Data Unit C and Data Unit D. The interface module 145 transmits this data container to the component 160 corresponding to the application 120 with which Data Unit C and Data Unit D are associated.

If in another example, the client process 110 commands a change in the data in Data Unit D that requires a database lock, it uses a root data unit to effect these changes. The client process 110 identifies the closest superior root object as Data Unit A, using the central model API 152 to identify the relationship. The generic interaction layer 105 generates a data container including the data structure as defined in the tables for data units Data Unit A, Data Unit C, Data Unit D, and Data Unit E. Data Unit B is not required in the data container because it has an aggregation relationship with Data Unit A.

A data container is not limited to related data units in a single hierarchical structure. A data container can include multiple data unit structures, each associated with different applications 130. In this case, the generic interaction layer 105 divides the data container into different portions, each portion associated with the different application 130. The generic interaction layer 105 transmits each of the portions to the applicable component 160 for processing with its corresponding application 130. Defined data containers can also be referenced in command parameters. So a defined data container including multiple data structures associated with different applications enables mass data handling with a single reference.

In one embodiment, the data structure of a data container is fully hidden and only accessible through a provided data container API (not shown). The following methods are example methods that can be included in a data container API. An add__1x_relations( ) method adds a set of either 1:1 (x=1) or 1:n (x=N) relations for a given data unit to the container. This extends the already existing relation entries. An add_IDs_in__1N_relation( ) adds a set of IDs to a given 1:n relation of a given object instance. The programmer can further decide if the object instances added to the relation should be created in the container. An add_data_unit( ) method adds a new data unit entry to the container. For this, the data unit name and its ID can be given. This combination should be unique in the container. An add_data_unit_attributes( ) method adds a set of attributes to a given data unit in the container. A change_ID_in__11_relation( ) method can be used to change an ID in a 1:1 relation. The given ID should be an application globally unique identifier ("GUID").

A change_IDs_in__1N_relation( ) method changes a set of IDs in a given 1:n relation of a given data unit instance. For each ID to change, the old and the new ID should be given. If the old ID is not already present for the relation, this entry is ignored. If the old ID is found in the relation, this entry and the referenced data unit instance are changed. A change_ data_unit_id( ) method sets a new ID for a given data unit. The ID is changed for the data unit itself and all relations referring this data unit. Furthermore, the change is logged for having a mapping table for old to new IDs. A check_data_unit_exists( ) method verifies whether a given data unit with its name and ID is already present in the container. A get_1x_relations( ) method returns either all 1:1 (x=1) or 1:n (x=N) relations for a given data unit. A get_attr_req_flag( ) method returns the information if the attributes of a given data unit are requested/to be read or not. A get_rels_req_flag( ) method returns the information if the relations of a given data unit are requested/to be read or not. A get_data_unit_attributes( ) method returns all attributes for a given data unit. A get_data_unit_list( ) method returns a list of all data units with their IDs and the information if attributes and/or relations are requested. Note that data units may be part of the container just to preserve the data structure hierarchy.

A get_root_data_unit( ) method returns the root data unit of the container. A get_children( ) method returns all child data units included in the container for a given parent data unit. The generic interaction layer 105 derives this information by using the underlying model and navigation along the stored relations. A get_parent( ) method returns the data unit name and ID which is referencing a given data unit instance. A reset( ) method clears all data included in the container. A set_data_unit_attributes( ) method sets the attributes of a given data unit. Unlike the add_data_unit_attributes( ) method, all existing entries will be overwritten.

Figure 4A:
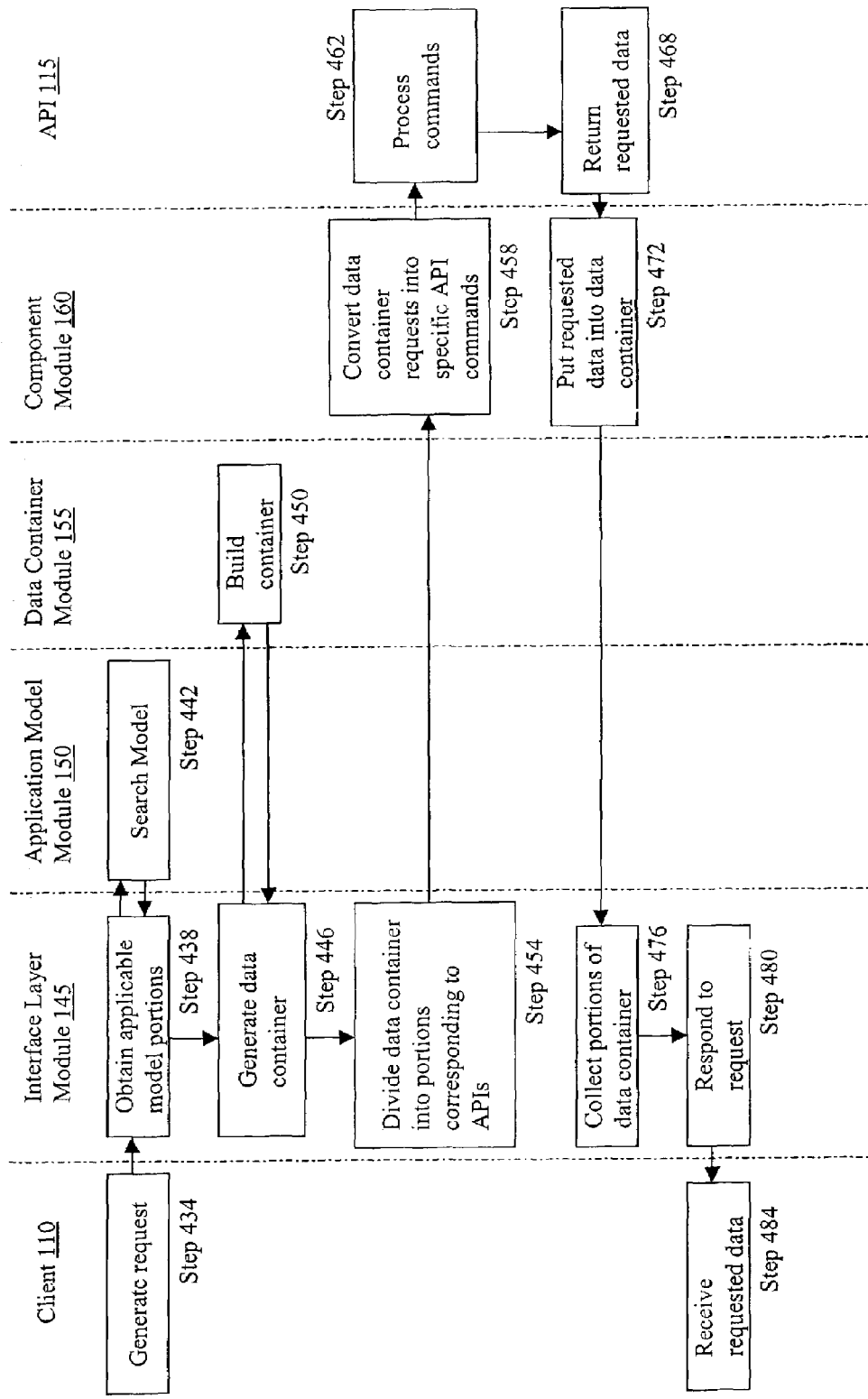
FIG. 4A is a flow diagram of an embodiment of a process employing the modules of a generic interaction layer.
Figure 4B:
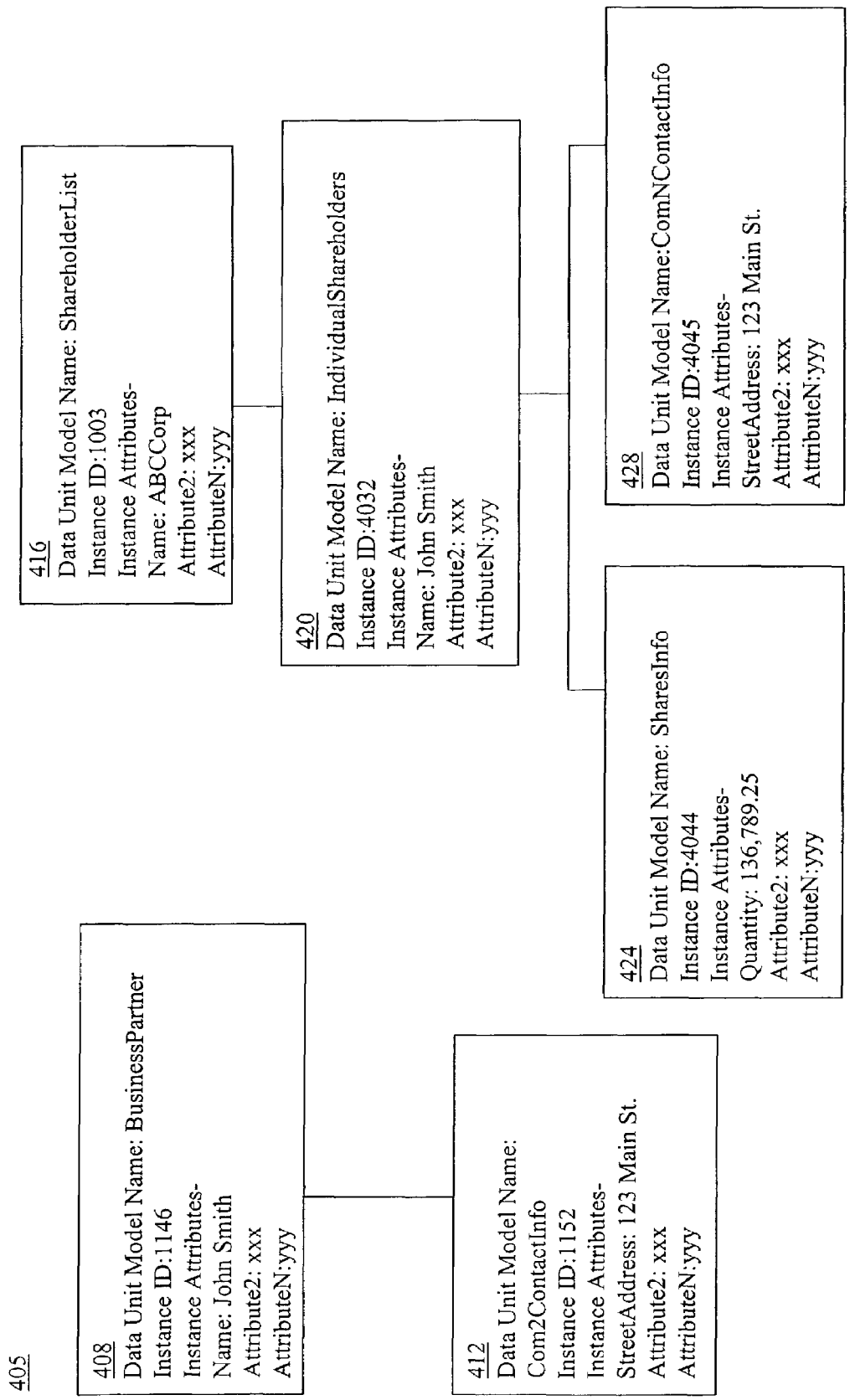
FIG. 4B is a block diagram of an embodiment of a relational structure of data units associated with the process of FIG. 4A.

FIG. 4A illustrates an example of a process 400 to fulfill a request from the client process 110. To further illustrate this process, FIG. 4B shows a relational structure 405 of data units associated with the process 400. The BusinessPartner data unit 408 has one child data unit 412. The ShareholderList data unit 416 has a child data unit 420, which has two children data units 424 and 428. The relational structure 405 represents the data units 408, 412, 416, 420, 424, and 428 in a populated data container (e.g., 157 of FIG. 1). However, these data units 408, 412, 416, 420, 424, and 428 will be referred to throughout the process 400 to help illustrate the process 400 and only where specifically stated will their use be specific to a populated data container. In this example, the client process 110 wants to read all contact information regarding an individual named John Smith. To do this, the client process 110 generates (step 434) a request to obtain this data, by transmitting, for example, a read( ) command as described above. An example of a read( ) command can be read(data_unit_reference, lock_requested, request_data_unit, view_name). The lock_requested, request_data_unit, and view_name parameters are optional parameters. The data_unit_reference parameter indicates the one or more data units for which attribute data is requested. This parameter includes at least one name of an access data unit, as defined by the model (e.g., 151 of FIG. 1) and an ID identifying a specific instance of that data unit. In this example, from previous requests, the client process 110 obtained both the model information, using the example commands for the model API 152 described above and IDs for the instances involving John Smith, using the query data units described above. This import parameter can be, for example, in the form of a table and takes the form as shown in Table 3. In Table 3 at least the ID for the starting access data unit has to be given. IDs for dependent data units are optional and may be given to restrict the result. If no ID is given for a requested data unit, all data units of this type belonging to the given access data unit will be returned.

TABLE 3

| "From" Data Unit | ID | Relationship Name | "To" Data Unit | ID |
|---|---|---|---|---|
| BusinessPartner | 1146 | BPtoCom2ConInfo | Com2ContactInfo | 1152 |
| ShareholderList | 1003 | SHList toIndSH | IndividualShareholders | 4032 |
| IndividualShareholders | 4032 | IndSHtoComNConInfo | ComNContactInfo | 4045 |

Referring back to the read( ) command, the lock_requested parameter enables the client process 110 to lock the read data that the one or more applicable applications return. This is particularly useful if the client process 110 wants to subsequently modify the returned data. The synchronization of the read command with a data lock ensures that the lock occurs at the state that is returned in response to the read request. The request_data_unit parameter can be used to further restrict the response. For example, this restriction can be that only a given set of attributes for a data unit is returned. The view_name parameter allows the client process 110 to pre-define the relational structure returned in response to the read request. For example, in response to the import parameter defined by Table 3, the interface layer module may return the view as depicted in the relational structure 405.

Upon receiving the read request from the client process 110, the interface layer module 150 obtains (step 438) the portions of the model 151 that are applicable to the request. The interface layer module 145 accomplishes this by searching (step 442) the model 151 in the application model module 150 for the data unit names and relations identified in the read( ) request data_unit_reference parameter (e.g., Table 3). The interface layer module 145 may increase the information included in data_unit_reference parameter based on the model 151 search (step 442) depending on the view name. Since the example view, as illustrated in FIG. 4B, also includes the SharesInfo data unit 424 it will be also returned despite the fact it was not part of the data unit reference.

After obtaining the needed information from the model 151, the interface layer module 145 generates (step 446) a data container. As described above, in one embodiment, the data within the data container 157 is hidden and all data manipulation is via a data container API. In this embodiment, as described above the interface layer module generates (step 446) data container API commands and sends them to the data container module 160 to build (step 450) the data container. For example, the interface layer module 145 uses an add_11_relations(relation_name) command to add each of the defined relations of Table 3 and any additional relations needed from the model search (step 442). The relation_name parameter is the unique relation name defined by the model 151. When complete, the data container is similar to the relational structure 405 except that there are no values in the data container for the attributes of the data units 408, 412, 416, 420, and 428.

With the data container built, the interface layer module divides (step 454) the data container into portions that correspond to the applications 130 from which the data is sought. In this example, the first relationship, BusinessPartner 408 and Com2ContactInfo 412 are associated with the second application 130b. The second and third relations involving data units 416, 420 and 428 are associated with the Nth application 130c. The interface layer module divides (step 454) the data container into one portion that corresponds to the second application 130b and another portion that corresponds to the Nth application 130c. In another embodiment, the interface layer module 145 can generate (step 446) two different data containers, one for each application.

The interface layer module 145 transmits each portion of the data container to the component module 160 that is associated with the corresponding application 130. For example, for the portion of the data container that corresponds to the second application 130b, the interface layer module 145 transmits that data portion to the second component module 160b. Similarly, for the portion of the data container that corresponds to the Nth application 130c, the interface layer module 145 transmits that data portion to the Nth component module 160c. The component module 160 converts (step 458) the data containers into the routines and protocol required by the APIs 115. For example, to retrieve the values for the attributes for the Com2ContactInfo data unit 412, the component module 160 issues a function module 'BPDataRead'. The APIs 115 process (step 462) the commands and obtain the requested data from their corresponding applications 130. The APIs 115 transmit (step 468) the requested data to the associated component modules 160. The component modules 160 convert the transmitted data and put (step 472) it in the data containers. For example, the component modules can use the data container API command set_unit_attributes( ) described above to put the attribute data into the data units within the data container.

The interface layer module 145 collects (step 476) the portions of the data containers from the component modules 160. This can include the interface layer module 145 monitoring the component modules 160 to determine when all of the component modules 160 have received data from their associated APIs 115 and added the data to the data container 157. When the data container has the requested data, the interface layer module 145 responds (step 480) to the client process request (e.g., in this case, the read( ) command). The client process 110 receives (step 484) the requested data (e.g., contact information for John Smith) and can perform another request. For example, modify the street address for John Smith. If the client process 110 does subsequently request to modify contact data, the client process 110 can utilize the data container that now exists and is applicable.

Figure 5:
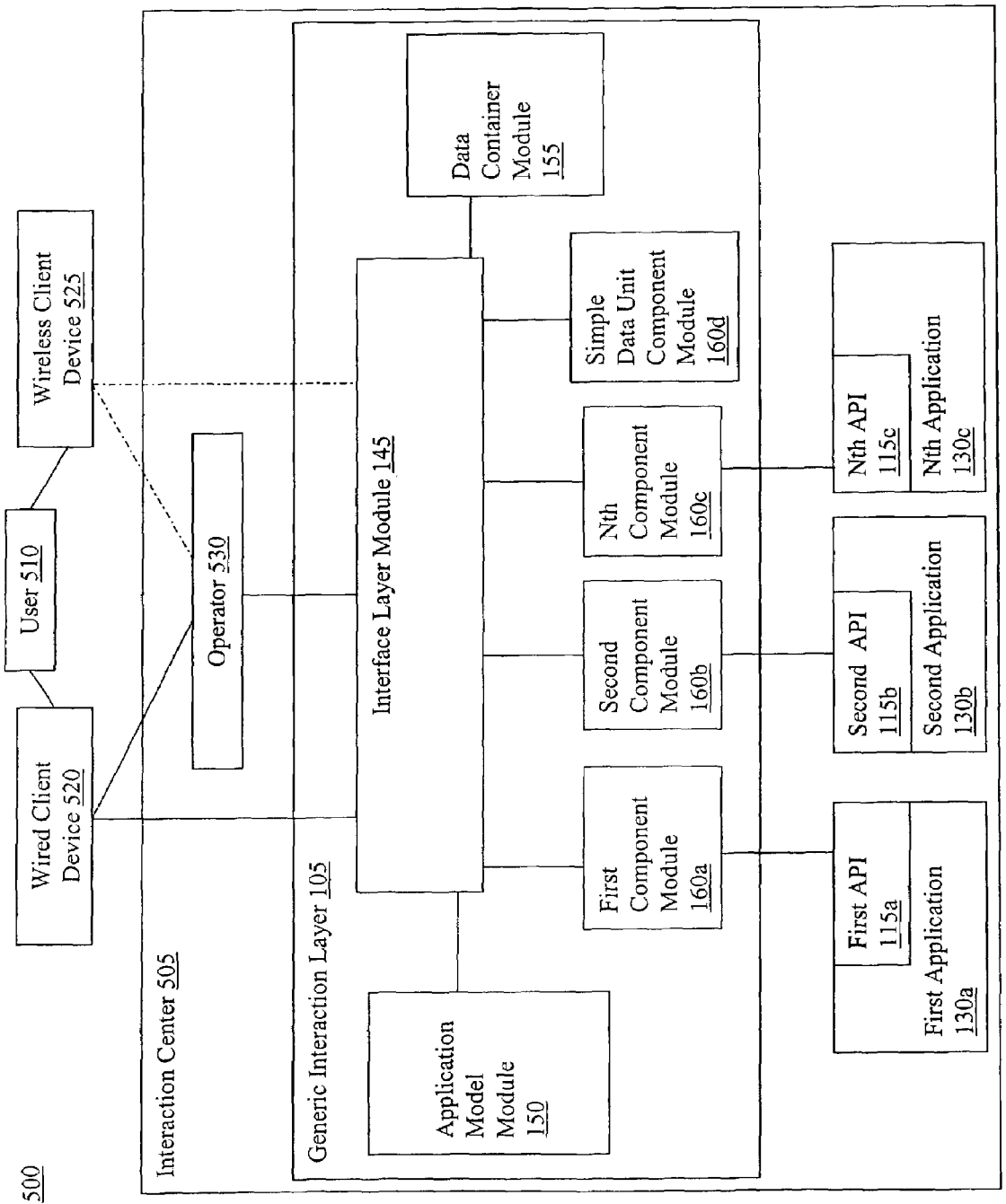
FIG. 5 is a block diagram of an interaction center including another illustrative embodiment of a generic interaction layer.

FIG. 5 illustrates an environment 500 with an interaction center 505 that exploits the advantages of a generic interaction layer 105. An interaction center 505 is a service center that allows a customer (e.g., user 510) multiple communication channels, with the goal of making it as easy as possible for the customer to interact with the enterprise. As illustrated, the interaction center 505 allows the user 510 to communicate with the generic interaction layer directly using a wired client device 520 and/or a wireless client device 525. The interaction center 505 also allows the user 510 to communicate with the generic interaction layer indirectly through an operator 530.

As described above, the generic interaction layer 105 offers a simple and consistent interface layer to any of the enterprise applications 130 with which the generic interaction layer 105 communicates. A UI employed by the client devices 520 and 525 and the client device used by the operator can be designed once to communicate with the generic interaction layer 105 and does not have to be updated in response to changes to the enterprise applications 130. The generic interaction layer is a canonical interface because all of the data units are passed through in a serialized way. In addition, data can be bounded in large portions, for example via data containers. These large portions allow compression algorithms to be more efficient. These large portions also reduce the number of calls required, thus eliminated latency associated with the eliminated calls. These advantages of the generic interaction layer 105 enable faster and more efficient communication with client devices over networks, such as the Internet.

A number of embodiments of the invention have been described. Nevertheless, it will be understood that various modifications may be made without departing from the spirit and scope of the invention. For example, other applications and APIs besides those illustrated can interface with the generic interaction layer. The modules described above can be implemented, for example, as part of a software program and/or a hardware device (e.g., ASIC, FPGA, processor, memory, storage). Additionally, the assignment of functionality to each of the modules of the generic interaction layer can be changed. Other distributions of functionality, for example, combining all of the functionality into a single module or distributing functionality among a plurality of processors for certain optimizations can be implemented. Accordingly, other embodiments are within the scope of the following claims.

---

Sample Model in an XML Format

```xml
<?xml version="1.0" encoding="UTF-8"?>
<REPOSITORY>
    <VERSION/>
    <APPLICATION/>
    <ENTITIES Count="4">
        <ENTITY Name="BusinessPartner">
            <ISROOTOBJECT>true</ISROOTOBJECT>
            <ISACCESSOBJECT>true</ISACCESSOBJECT>
            <PROPERTIES Count="4">
                <PROPERTY Name="bpNumber">
                    <MAXLENGTH>10</MAXLENGTH>
                    <MODIFYMODE>Normal</MODIFYMODE>
                    <TYPE>String</TYPE>
                </PROPERTY>
                <PROPERTY Name="firstname">
```

-continued

Sample Model in an XML Format

```
            <MAXLENGTH>40</MAXLENGTH>
            <MODIFYMODE>Normal</MODIFYMODE>
            <TYPE>String</TYPE>
        </PROPERTY>
        <PROPERTY Name="lastname">
            <MAXLENGTH>40</MAXLENGTH>
            <MODIFYMODE>Normal</MODIFYMODE>
            <TYPE>String</TYPE>
        </PROPERTY>
        <PROPERTY Name="birthname">
            <MAXLENGTH>40</MAXLENGTH>
            <MODIFYMODE>Normal</MODIFYMODE>
            <TYPE>String</TYPE>
        </PROPERTY>
    </PROPERTIES>
    <METHODS Count"0"/>
</ENTITY>
<ENTITY Name="BusinessPartnerAddress">
    <ISROOTOBJECT>false</ISROOTOBJECT>
    <ISACCESSOBJECT>false</ISACCESSOBJECT>
    <ROOTNAME>BusinessPartner</ROOTNAME>
    <PROPERTIES Count="5">
        <PROPERTY Name="city">
            <MAXLENGTH>40</MAXLENGTH>
            <MODIFYMODE>Normal</MODIFYMODE>
            <TYPE>String</TYPE>
        </PROPERTY>
        <PROPERTY Name="district">
            <MAXLENGTH>40</MAXLENGTH>
            <MODIFYMODE>Normal</MODIFYMODE>
            <TYPE>String</TYPE>
        </PROPERTY>
        <PROPERTY Name="poBox">
            <MAXLENGTH>10</MAXLENGTH>
            <MODIFYMODE>Normal</MODIFYMODE>
            <TYPE>String</TYPE>
        </PROPERTY>
        <PROPERTY Name="street">
            <MAXLENGTH>60</MAXLENGTH>
            <MODIFYMODE>Normal</MODIFYMODE>
            <TYPE>String</TYPE>
        </PROPERTY>
        <PROPERTY Name="houseNo">
            <MAXLENGTH>10</MAXLENGTH>
            <MODIFYMODE>Normal</MODIFYMODE>
            <TYPE>String</TYPE>
        </PROPERTY>
    </PROPERTIES>
    <METHODS Count="0"/>
</ENTITY>
<ENTITY Name="ContactPersonAddress">
    <ISROOTOBJECT>false</ISROOTOBJECT>
    <ISACCESSOBJECT>true</ISACCESSOBJECT>
    <ROOTNAME>BusinessPartner</ROOTNAME>
    <PROPERTIES Count="5">
        <PROPERTY Name="city">
            <MAXLENGTH>40</MAXLENGTH>
            <MODIFYMODE>Normal</MODIFYMODE>
            <TYPE>String</TYPE>
        </PROPERTY>
        <PROPERTY Name="district">
            <MAXLENGTH>40</MAXLENGTH>
            <MODIFYMODE>Normal</MODIFYMODE>
            <TYPE>String</TYPE>
        </PROPERTY>
        <PROPERTY Name="poBox">
            <MAXLENGTH>10</MAXLENGTH>
            <MODIFYMODE>Normal</MODIFYMODE>
            <TYPE>String</TYPE>
        </PROPERTY>
        <PROPERTY Name="street">
            <MAXLENGTH>60</MAXLENGTH>
            <MODIFYMODE>Normal</MODIFYMODE>
            <TYPE>String</TYPE>
        </PROPERTY>
        <PROPERTY Name="houseNo">
            <MAXLENGTH>10</MAXLENGTH>
```

Sample Model in an XML Format

```
                <MODIFYMODE>Normal</MODIFYMODE>
                <TYPE>String</TYPE>
            <PROPERTY>
        </PROPERTIES>
        <METHODS Count="0"/>
    </ENTITY>
    <ENTITY Name="ContactPersonRelationship">
        <ISROOTOBJECT>false</ISROOTOBJECT>
        <ISACCESSOBJECT>false</ISACCESSOBJECT>
        <ROOTNAME>BusinessPartner</ROOTNAME>
        <PROPERTIES Count"="5">
            <PROPERTY Name="bpNumber">
                <MAXLENGTH>10</MAXLENGTH>
                <MODIFYMODE>Normal</MODIFYMODE>
                <TYPE>String</TYPE>
            </PROPERTY>
            <PROPERTY Name="conpNumber">
                <MAXLENGTH>10</MAXLENGTH>
                <MODIFYMODE>Normal</MODIFYMODE>
                <TYPE>String</TYPE>
            </PROPERTY>
            <PROPERTY Name="dateFrom">
                <MAXLENGTH>8</MAXLENGTH>
                <MODIFYMODE>Normal</MODIFYMODE>
                <TYPE>Date</TYPE>
            </PROPERTY>
            <PROPERTY Name="dateTo">
                <MAXLENGTH>8</MAXLENGTH>
                <MODIFYMODE>Normal</MODIFYMODE>
                <TYPE>Date</TYPE>
            </PROPERTY>
            <PROPERTY Name="function">
                <MAXLENGTH>4</MAXLENGTH>
                <MODIFYMODE>Normal</MODIFYMODE>
                <TYPE>String</TYPE>
            </PROPERTY>
        </PROPERTIES>
        <METHODS Count="0"/>
    </ENTITY>
</ENTITIES>
<QUERYSERVICES Count="2">
    <QUIERYSERVICE Name="BusinessPartnerQuery">
        <RETURNENTITY>BusinessPartner</RETURNENTITY>
        <PROPERTIES Count="7">
            <PROPERTY Name="CITY">
                <MAXLENGTH>25</MAXLENGTH>
                <MINLENGTH>-1</MINLENGTH>
                <MODIFYMODE>Normal</MODIFYMODE>
                <TYPE>String</TYPE>
                <PRECISION>-1</PRECISION>
            </PROPERTY>
            <PROPERTY Name="COUNTRY">
                <MAXLENGTH>3</MAXLENGTH>
                <MINLENGTH>-1</MINLENGTH>
                <MODIFYMODE>Normal</MODIFYMODE>
                <TYPE>String</TYPE>
                <PRECISION>-1</PRECISION>
            </PROPERTY>
            <PROPERTY Name="EMAIL">
                <MAXLENGTH>241</MAXLENGTH>
                <MINLENGTH>-1</MINLENGTH>
                <MODIFYMODE>Normal</MODIFYMODE>
                <TYPE>String</TYPE>
                <PRECISION>-1</PRECISION>
            </PROPERTY>
            <PROPERTY Name="HOUSE_NUM">
                <MAXLENGTH>10</MAXLENGTH>
                <MINLENGTH>-1</MINLENGTH>
                <MODIFYMODE>Normal</MODIFYMODE>
                <TYPE>String</TYPE>
                <PRECISION>-1</PRECISION>
            </PROPERTY>
            <PROPERTY Name="NAME">
                <MAXLENGTH>35</MAXLENGTH>
                <MINLENGTH>-1</MINLENGTH>
                <MODIFYMODE>Normal</MODIFYMODE>
                <TYPE>String</TYPE>
```

Sample Model in an XML Format

```xml
            <PRECISION>-1</PRECISION>
        </PROPERTY>
        <PROPERTY Name="STREET">
            <MAXLENGTH>25</MAXLENGTH>
            <MINLENGTH>-1</MINLENGTH>
            <MODIFYMODE>Normal</MODIFYMODE>
            <TYPE>String</TYPE>
            <PRECISION>-1</PRECISION>
        </PROPERTY>
        <PROPERTY Name="TELEPHONE">
            <MAXLENGTH>30</MAXLENGTH>
            <MINLENGTH>-1</MINLENGTH>
            <MODIFYMODE>Normal</MODIFYMODE>
            <TYPE>String</TYPE>
            <PRECISION>-1</PRECISION>
        </PROPERTY>
    </PROPERTIES>
</QUERYSERVICE>
<QUERYSERVICE Name="ContactPersonQuery">
<RETURNENTITY>ContactPersonRelationship</RETURNENTITY>
        <PROPERTIES Count="7">
            <PROPERTY Name="TELEPHONE">
                <MAXLENGTH>30</MAXLENGTH>
                <MODIFYMODE>Normal</MODIFYMODE>
                <TYPE>String</TYPE>
            </PROPERTY>
            <PROPERTY Name="EMAIL">
                <MAXLENGTH>241</MAXLENGTH>
                <MODIFYMODE>Normal</MODIFYMODE>
                <TYPE>String</TYPE>
            </PROPERTY>
            <PROPERTY Name="CITY">
                <MAXLENGTH>25</MAXLENGTH>
                <MODIFYMODE>Normal</MODIFYMODE>
                <TYPE>String</TYPE>
            </PROPERTY>
            <PROPERTY Name="COUNTRY">
                <MAXLENGTH>3</MAXLENGTH>
                <MODIFYMODE>Normal</MODIFYMODE>
                <TYPE>String</TYPE>
            </PROPERTY>
            <PROPERTY Name="REGION">
                <MAXLENGTH>3</MAXLENGTH>
                <MODIFYMODE>Normal</MODIFYMODE>
                <TYPE>String</TYPE>
            </PROPERTY>
            <PROPERTY Name="STREET">
                <MAXLENGTH>25</MAXLENGTH>
                <MODIFYMODE>Normal</MODIFYMODE>
                <TYPE>String</TYPE>
            </PROPERTY>
            <PROPERTY Name="HOUSE_NUM">
                <MAXLENGTH>10</MAXLENGTH>
                <MODIFYMODE>Normal</MODIFYMODE>
                <TYPE>String</TYPE>
            </PROPERTY>
        </PROPERTIES>
    </QUERYSERVICE>
</QUERYSERVICES>
<RELATIONS Count="3">
    <RELATION Name="BuilStandardAddressRel" RelationType="Aggregation">
        <SOURCE Cardinality="1" EntityName="BusinessPartner"/>
        <TARGET Cardinality="0 Or 1" EntityName="BusinessPartnerAddress"/>
    </RELATION>
    <RELATION Name="BuilContactPersonRel" RelationType="Association">
        <SOURCE Cardinality="1" EntityName="BusinessPartner"/>
        <TARGET Cardinality="n" EntityName="ContactPersonRelationship"/>
    </RELATION>
    <RELATION Name="BuilContactPersonAddressRel" RelationType="Aggregation">
        <SOURCE Cardinality="1" EntityName="ContactPersonRelationship"/>
        <TARGET Cardinality="0 Or 1" EntityName="ContactPersonAddress"/>
```

-continued

Sample Model in an XML Format

```
    </RELATION>
  </RELATIONS>
</REPOSITORY>
```

What is claimed is:

1. A method for retrieving stored data, the method comprising:

receiving from a client a request for electronic data that comprises multiple requested data portions that are each predefined to be retrieved from a different one of multiple different computing applications;

generating, in response to receiving the request and substantially contemporaneously with receiving the request, a data container in which to store the requested electronic data, wherein the data container is generated in compliance with a model representing data structures of the multiple different computing applications;

dividing the data container into multiple data-storing portions that each corresponds to, and complies with a data model of, a different one of the multiple different computing applications;

populating each of the data-storing portions with data retrieved from the respective one of the multiple computing applications from which the requested data portion is predefined to be retrieved; and responding to the received request using the populated data-storing portions.

2. The method of claim 1 further comprising transmitting the data-storing portions to components corresponding to the multiple different computing applications.

3. The method of claim 1 further comprising interacting with the data container using a data container API.

4. A method comprising:

receiving a request for electronic data corresponding to a first application and a second application;

associating the received request with the first application and the second application;

generating a data container, in response to receiving the request and substantially contemporaneously with receiving the request, using a first model portion associated with the first application and a second model portion associated with the second application;

dividing the data container into a first portion and a second portion corresponding to the first and second applications; and populating the first portion with data from the first application and populating the second portion with data from the second application.

5. The method of claim 4 wherein the first and second model portions comprise an XML file.

6. The method of claim 4 wherein the first and second model portions comprise a table.

7. The method of claim 4 further comprising generating a global model comprising the first and second model portions.

8. The method of claim 4, wherein populating the first portion with data from the first application and populating the second portion with data from the second application comprises:

requesting data needed to populate the first portion and the second portion from the corresponding first application and second application; and receiving from the first and second applications data responsive to the requests.

9. The method of claim 8 further comprising responding to the received request using the data received from the first and second applications.

10. The method of claim 8 wherein requesting data comprises determining API commands to interact with the corresponding first and second applications.

11. The method of claim 4, further comprising generating the first model, wherein generating the first model comprises:

defining a data type for a first data unit of the data structure; and defining a relationship between the first data unit and a second data unit.

12. The method of claim 11 wherein the data type comprises a root data unit, an access data unit, a dependent data unit, or a query data unit.

13. The method of claim 11 wherein the relationship comprises an aggregation, a composition, or an association.

14. The method of claim 11 wherein the first data unit comprises an object.

15. The method of claim 11 wherein the second data unit comprises an object.

16. The method of claim 11 wherein the relationship is uni-directional.

17. An article comprising a machine-readable medium that stores executable instruction signals that cause a machine to:

receive from a client a request for electronic data that comprises multiple requested data portions that are each predefined to be retrieved from a different one of multiple different computing applications;

generate, in response to the received request and substantially contemporaneously with receiving the request, a data container in which to store the requested electronic data, wherein generating comprises generating the data container in compliance with a model representing data structures of the multiple different computing applications;

divide the data container into multiple data-storing portions that each corresponds to, and complies with a data model of, a different one of the multiple different computing applications; and populate each of the data-storing portions with data retrieved from the respective one of the multiple different computing applications from which the requested data portion is predefined to be retrieved.

18. The article of claim 17 further comprising executable instruction signals that cause a machine to transmit the data-storing portions to components corresponding to the multiple different computing applications.

19. The article of claim 17 further comprising executable instruction signals that cause a machine to respond to the client request using the populated data.

20. The article of claim 17 further comprising executable instruction signals that cause a machine to interact with the data container using a data container API.

21. An article comprising a machine-readable medium that stores executable instruction signals that cause a machine to:
   generate a first model portion of a data structure for a first application and a second model portion of a data structure for a second application;
   receive a request for electronic data corresponding to the first application and the second application;
   associate the received request with the first and second applications;
   generate a data container, in response to the received request and substantially contemporaneously with receiving the request, using the first and second model portions;
   divide the data container into a first portion and a second portion corresponding to the first and second applications; and
   populate the first portion with data from the first application and populate the second portion with the data from the second application.

22. An interaction center comprising:

a transceiver to receive from a client device a client request for electronic data that is stored in multiple different computing applications and that comprises multiple requested data portions that are each predefined to be retrieved from a different one of the multiple different computing applications;

a generic interface layer configured to a) generate a data container, in response to receiving the client request and substantially contemporaneously with receiving the client request, in which to store the requested electronic data; b) divide the data container into multiple data-storing portions that each corresponds to, and complies with a data model of, a different one of the multiple different computing applications; and c) populate each of the data-storing portions with data retrieved from the respective one of the multiple different computing applications from which the requested data portion is predefined to be retrieved.

* * * * *